(12) United States Patent
Burke

(10) Patent No.: US 8,279,120 B2
(45) Date of Patent: Oct. 2, 2012

(54) INTERCONNECTED NANOSYSTEMS

(75) Inventor: Peter J. Burke, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 784 days.

(21) Appl. No.: 11/573,443

(22) PCT Filed: Aug. 12, 2005

(86) PCT No.: PCT/US2005/028893
§ 371 (c)(1),
(2), (4) Date: Jun. 10, 2009

(87) PCT Pub. No.: WO2007/011365
PCT Pub. Date: Jan. 25, 2007

(65) Prior Publication Data
US 2009/0251371 A1 Oct. 8, 2009

(51) Int. Cl.
*H01Q 1/38* (2006.01)
(52) U.S. Cl. .................. 343/700 MS; 343/893; 343/702
(58) Field of Classification Search ........... 343/700 MS, 343/702, 893
See application file for complete search history.

(56) References Cited

U.S. PATENT DOCUMENTS

| | | | |
|---|---|---|---|
| 6,038,060 A | | 3/2000 | Crowley |
| 6,256,767 B1 | | 7/2001 | Kuekes et al. |
| 2002/0084410 A1 | | 7/2002 | Colbert et al. |
| 2004/0070543 A1 * | | 4/2004 | Masaki ................. 343/702 |
| 2005/0116861 A1 * | | 6/2005 | Anazawa et al. ...... 343/700 MS |
| 2005/0128146 A1 | | 6/2005 | Schantz |
| 2005/0218398 A1 | | 10/2005 | Tran |

FOREIGN PATENT DOCUMENTS

| JP | 2003298338 A | * 10/2003 |
|---|---|---|
| WO | WO 03/083993 A | 10/2003 |
| WO | WO 2004/053464 A | 6/2004 |

OTHER PUBLICATIONS

Burke, "AC Performance of nanoelectrics: towards a ballistic THz nanotube transistor", Solid-State Electronics 48 (2004), pp. 1981-1986.
Yu et al., "Synthesis of aligned arrays of millimeter long, straight single-walled carbon nanotubes", Chemistry Materials, vol. 16, No. 18 (2004) pp. 3414-3416.
DeHon, "Array-based architecture for FET-based, nanoscale electronics", IEEE Transactions on Nanotechnology, vol. 2, No. 1 (2003), pp. 23-32.
Burke, "An RF circuit model for carbon nanotubes", IEEE Transactions on Nanotechnology, vol. 2, No. 1 (2003), pp. 55-58.

(Continued)

*Primary Examiner* — Dieu H Duong
(74) *Attorney, Agent, or Firm* — Dickstein Shapiro LLP; Kenneth S. Roberts

(57) ABSTRACT

Communication to or from a nanodevice is provided with a nanostructure-based antenna, preferably formed from, but not limited to, a single wall nanotube (SWNT). Other nanostructure-based antennas include double walled nanotubes, semiconducting nanowires, metal nanowires and the like. The use of a nanostructure-based antenna eliminates the need to provide a physical communicative connection to the nanodevice, while at the same time allowing communication between the nanodevice and other nanodevices or outside systems, i.e., systems larger than nanoscale such as those formed from semiconductor fabrication processes such as CMOS, GaAs, bipolar processes and the like.

11 Claims, 2 Drawing Sheets

OTHER PUBLICATIONS

Li, et al., "Electrical properties of 0.4 cm long single-walled carbon nanotubes", Nano Letters vol. 4, No. 10 (2004), pp. 2003-2007.

Li et al., "Carbon nanotube transistor operation at 2.6 GHz", Letters, vol. 4, No. 4 (2004), pp. 753-756.

Appenzeller et al., "Frequency dependent characterization of transport properties in carbon nanotube transistors", Applied Physics Letters, vol. 84, No. 10 (2004) pp. 1771-1773.

Rueckes et al., "Carbon Nanotoube-based nonvolatile random access memory for molecular computing", Science, vol. 289 (2000), pp. 94-97.

Chen et al., "Nanoscale molecular-switch crossbar circuits", Nanotechnology, vol. 14 (2003), pp. 462-468.

Frank et al., "High-frequency response in Carbon Nanotube field-effect transistors", IEEE Electron Device Letters, vol. 25, No. 1 (2004), pp. 34-36.

Burke et al., "Quantitative Theory of nanowire and nanotube antenna performance", IEEE Transactions on Nanotechnology, vol. 5, No. 4 (2006), pp. 314-333.

Zhu QI et al: "Research on the Possibility of Nano-Tube Antenna" Antennas and Propagation Society Symposium, 2004. IEEE Monterey, CA, USA Jun. 20-25, 2004, Piscataway, NJ, USA, IEEE, vol. 2, Jun. 20, 2004, pp. 1927-1930.

* cited by examiner

— 1 —
INTERCONNECTED NANOSYSTEMS

FIELD OF THE INVENTION

The present invention relates generally to the field of nanotechnology, and more particularly, to interconnects for nanotubes, nanowires and other nanoscale structures and devices.

BACKGROUND INFORMATION

Essentially all devices needed to make the equivalent of a modern digital or analog circuit out of nanotubes and/or nanowires have been demonstrated in prototype experiments, and elementary logic circuits have been demonstrated. Various researchers have claimed that nanowire/nanotube devices are superior to CMOS in various metrics, such as transconductance per width or mobility. When properly phrased, these claims are true. The underlying, unspoken motivation remains, however, that the devices are or can be smaller than spatial resolution limits posed by lithography, which would provide a route to extend Moore's law into the domain of nanotechnology.

The nanotube and nanowire devices developed to date have been contacted by lithographically fabricated electrodes. This is not a scalable technique for massively parallel processing, integrated nanosystems, due to the geometrical limits of lithography. The potential high-density circuitry possible with nanowires and nanotubes will not be realized if each nanowire and nanotube is contacted lithographically.

Fault-tolerant architectural schemes have recently been proposed to tackle this interconnect problem. For example, using N lithographically fabricated wires, it is possible to address individually $2^N$ nanowires using a binary-tree multiplexing scheme. Since the spacing between the nanowires is beyond the limits of lithography, the electrical connections between the nanowires and lithographically fabricated wires are random, but could in principle be measured after the manufacturing process. With this technique, each chip manufactured would have its own unique firmware, specific to the nano-level physical hardware defects.

However, a more manufacturable interconnect is needed that allows efficient implementation and full scalability of integrated nanosystems.

SUMMARY

Described below are exemplary embodiments of wireless interconnects for nanodevices and nanosystems. These embodiments are examples only and are not intended to limit the invention.

The devices, systems and methods described herein provide wireless interconnects for nanodevices and nanosystems. More specifically, communication to or from a nanodevice is provided with a nanostructure-based antenna, preferably formed from, but not limited to, a single wall nanotube (SWNT). Other nanostructure-based antenna include double walled nanotubes, semiconducting nanowires, metal nanowires and the like. The use of a nanostructure-based antenna eliminates the need to provide a physical communicative connection to the nanodevice, while at the same time allowing communication between the nanodevice and other nanodevices or outside systems.

In one embodiment, a wirelessly interconnected system includes a nanodevice with a nanostructure-based antenna coupled thereto and an outside system configured to communicate with the nanodevice using the nanostructure-based antenna. The nanodevice is configured to communicate over the nanostructure-based antenna,.

In another embodiment, a method of fabricating an interconnected nanosystem includes forming a nanodevice having a communication lead and coupling a nanostructure-based antenna to the communication lead. Preferably, the coupling of a nanostructure-based antenna to the communication lead comprises forming a carbon nanotube on the lead.

In yet another embodiment, a method of communicating with a nanostructured device by wirelessly transmitting information from a first device, and wirelessly receiving information at a second device, wherein at least one of the first and second devices is a nanostructured device In yet another embodiment, an interconnected system includes a first device and a second device wirelessly coupled to the first device, wherein one of the first and second devices is a nanodevice.

In yet another embodiment, an interconnected system includes a first device and a second device wirelessly coupled to the first device, wherein one of the first and second devices includes a nanostructure-based antenna.

The above and other preferred features, including various novel details of implementation and combination of elements will now be more particularly described with reference to the accompanying drawings and pointed out in the claims. It will be understood that the particular methods and apparatus are shown by way of illustration only and not as limitations. As will be understood by those skilled in the art, the principles and features explained herein may be employed in various and numerous embodiments.

BRIEF DESCRIPTION OF THE FIGURES

The details of the invention, including fabrication, structure and operation, may be gleaned in part by study of the accompanying figures, in which like reference numerals refer to like segments.

Figure 1:
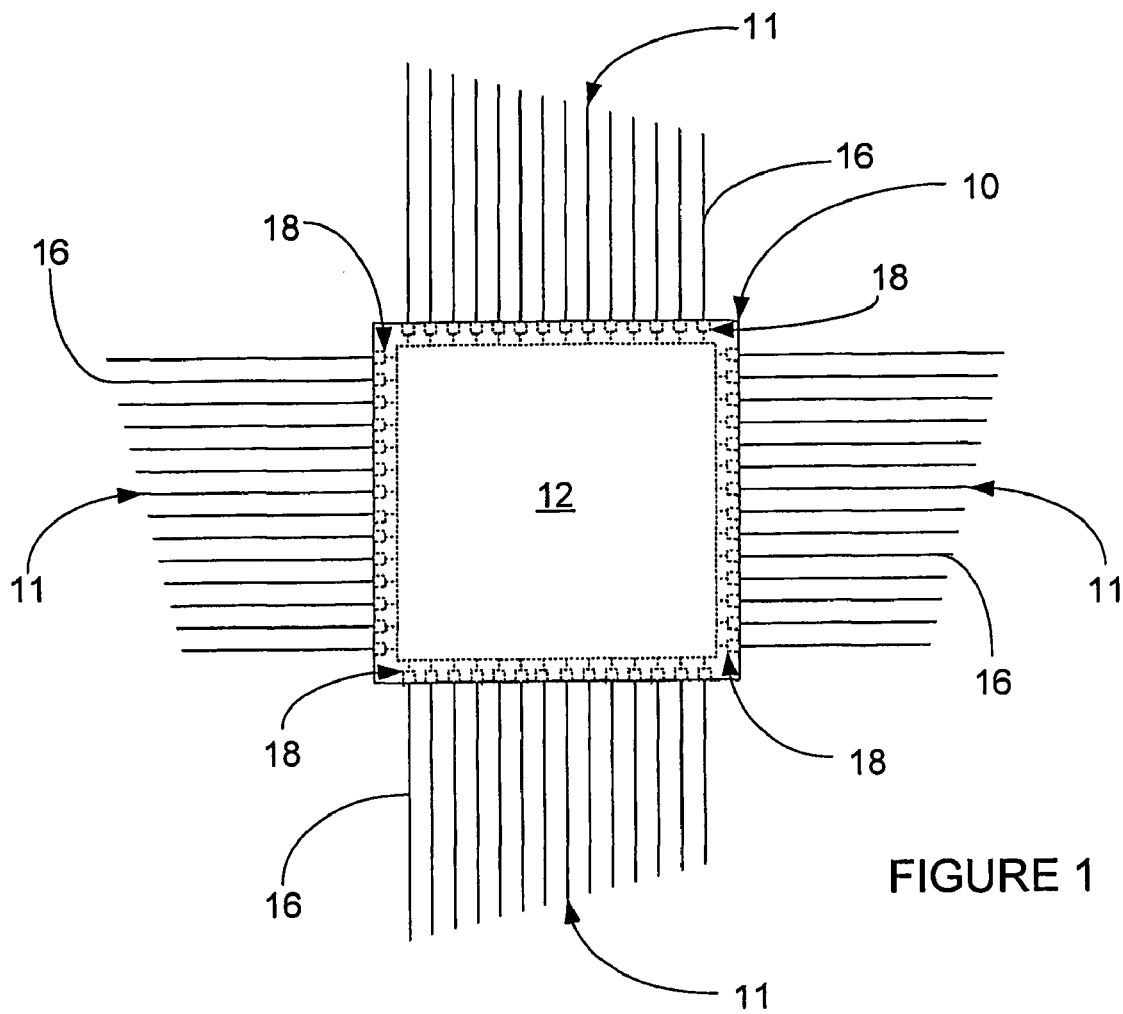
FIG. 1 depicts a schematic of one exemplary embodiment of a nano-structure device.

It should be noted that the figures are not drawn to scale and that elements of similar structures or functions are generally represented by like reference numerals for illustrative purposes throughout the figures. It also should be noted that the figures are only intended to facilitate the description of the preferred embodiments.

DETAILED DESCRIPTION

Each of the additional features and teachings disclosed below may be utilized separately or in conjunction with other features and teachings to provide wireless interconnects, such as nanostructure-based antennas, for nanodevices and nanosystems. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

The disclosure provided herein relates to U.S. Provisional Patent Application Ser. No. 60/601,230, filed on Aug. 12, 2004, which application is incorporated herein by reference as if set forth in full.

The devices, systems and methods described herein provide wireless interconnects for nanodevices and nanosystems. More specifically, communication to or from a nanodevice is provided with a nanostructure-based antenna, preferably formed from, but not limited to, a single wall nanotube (SWNT). Other nanostructure-based antenna include double walled nanotubes, semiconducting nanowires, metal nanowires and the like. The use of a nanostructure-based antenna eliminates the need to provide a physical communicative connection to the nanodevice, while at the same time allowing communication between the nanodevice and other nanodevices or outside systems, i.e., systems larger than nanoscale such as those formed from semiconductor fabrication processes such as CMOS, GaAs, bipolar processes and the like.

Nanostructure-based antennas can be used for other antenna applications as well, including, but not limited to RFID applications. In some cases, each nanostructure, i.e., nanotube or nanowire, can be a separate antenna. In other cases, the nanostructure can be just part of an antenna. For example, nanotubes can be used as components of composite materials wherein the nanotube-based composite material serves as the antenna.

FIG. 1 depicts an exemplary embodiment of a nanodevice 10 capable of wireless communication. The nanodevice 10 has multiple nanostructure-based antennas 16, such as nanotube antennas, that together form antenna arrays 11 extending from each of the four sides of the nanodevice 10. Preferably, each nanotube antenna 16 within the arrays 11 has a separate resonant frequency and is configured to communicate over a separate wireless frequency channel corresponding to that resonant frequency. In this manner, a multichannel communication signal transmitted from another device or outside system can be received by the nanodevice 10. Because each nanotube 16 within the arrays 11 receives information on a separate channel, each of the array 11 can act as a communication port where each antenna 16 effectively acts as an input/output connection.

For instance, in this embodiment, the nanodevice 10 has fourteen circuit inputs 18 per device side, each connected to a separate nanotube antenna 16. The input signals for each of these inputs 18 are transmitted from another device or outside system on fourteen separate channels so that each nanostructure-based antenna 16 receives only the communications transmitted over the respective resonant frequency. This allows the transfer of separate, unique amounts of information to each individual input 18 via the respective nanostructure-based antennas 16.

The nanodevice 10 can have any number of nanotube antennas 16 configured to receive, transmit or both. In embodiments where each nanotube antenna 16 is tuned to a separate resonant frequency, the number of nanotube antennas 16 available to receive data on separate channels is limited only by the available bandwidth.

The nanodevice 10 can be any nanoscale device, or device having nanoscale components. The internal structure 12 of the nanodevice 10 can range from simple nanotubes or nanoelectrodes to more complex integrated nanosystems having nanotubes, nanowires, nanotransistors, self-assembling DNA and the like. Furthermore, the term nanoscale is not intended to limit the systems and methods herein but instead to facilitate reference to any apparatus, structure, device, thing or object measured with reference to nanometers. One of skill in the art will readily recognize that the term nanoscale can include structures that are less than one nanometer in size, while also including structures that are greater than 1000 nanometers in size.

The nanostructure-based antennas 16 can be formed from any nanoscale structure that acts as an antenna. In a preferred embodiment, nanostructure-based antennas 16 are formed from carbon single walled nanotubes (SWNTs). Each carbon SWNT antenna 16 can be tuned to a resonant frequency by adjustment of it's length. For instance, a one centimeter carbon SWNT antenna 16 has a resonant frequency of 4 Gigahertz.

In a preferred embodiment, a carbon SWNT antenna is formed or grown, as described in greater detail in copending application Ser. No. 11/198,902 filed Aug. 5, 2005, entitled "SYNTHESIS OF SINGLE-WALLED CARBON NANOTUBES" is incorporated herein by reference, in a single furnace system comprising a modified CVD reaction chamber which reduces the turbulence of the gas flow of the hydrocarbon source provided during the growth phase. The reduced turbulence creates an enhanced environment for ultra-long nanotube formation. In addition, a raised platform, comprising an underlayer of metal, is deposited onto a substrate. The raised platform allows the nanotube to grow freely suspended from the substrate in the low turbulence gas flow. This reduces any steric force impedance caused by the substrate and enables the nanotube to be grown to lengths on the order of centimeters.

Figure 2:
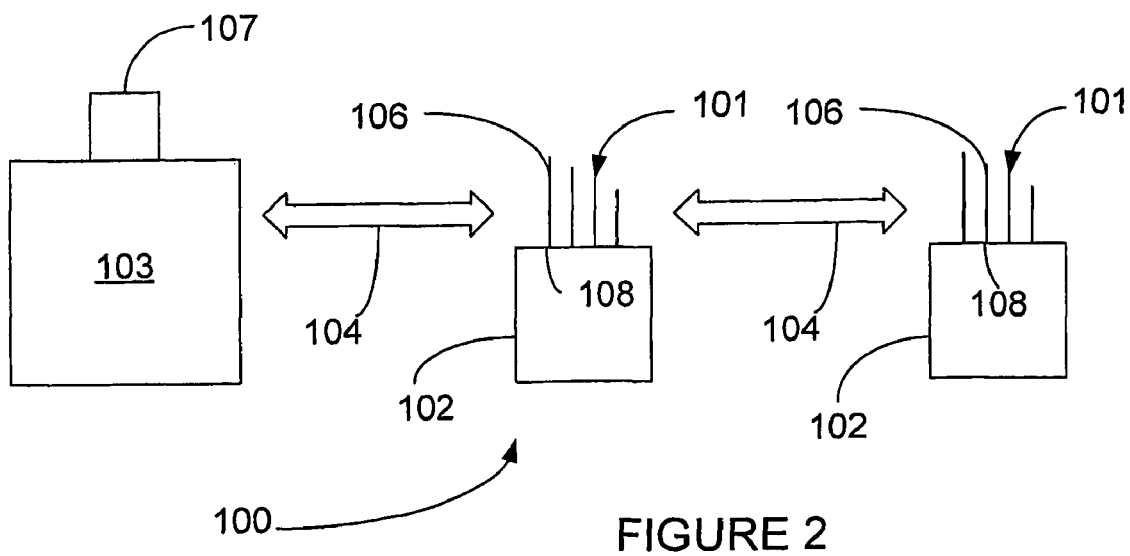
FIG. 2 depicts a block diagram of one exemplary embodiment of an interconnected nanosystem.

FIG. 2 depicts an exemplary embodiment of an interconnected nanosystem 100, including nanodevices 102 and an outside system 103. Here, each nanodevice has multiple nanotube antennas 106 that together form an nanotube antenna array 101. Preferably, each nanotube antenna 106 within the array 101 has a separate resonant frequency and is configured to communicate over a separate wireless frequency channel corresponding to that resonant frequency. In this manner, a multichannel communication signal transmitted from outside the outside system 103 via an antenna 107 can be received by the nanodevice 102. Because each nanotube 106 within the array 101 receives information on a separate channel, array 101 can act as a communication port where each antenna 106 effectively acts as an input/output connection.

For instance, in this embodiment each nanodevice 102 has four circuit inputs 108, each connected to a separate nanotube antenna 106. The input signals for each of these inputs 108 are transmitted from the outside system 103 on four separate channels over communication path 104 so that each nanostructure-based antenna 106 receives only the communications transmitted over the respective resonant frequency. This allows the transfer of separate, unique amounts of information from the outside system 103 to each individual input 108 via the respective nanostructure-based antenna 106.

The interconnected nanosystem 100 is not limited to communication solely between the outside system 103 and a nanodevice 102. Each of the nanodevices 102 can communicate with other nanodevices 102 in a similar manner over communication path 104.

Each nanodevice 102 can have any number of nanotube antennas 106 configured to receive, transmit or both. In embodiments where each nanotube antenna 106 is tuned to a separate resonant frequency, the number of nanotube antennas 106 available to receive data on separate channels is limited only by the available bandwidth in communication path 104 or each individual channel. However, other techniques can be used to increase the data transferring capacity of system 100, such as time or code signal multiplexing and the like.

Figure 3:
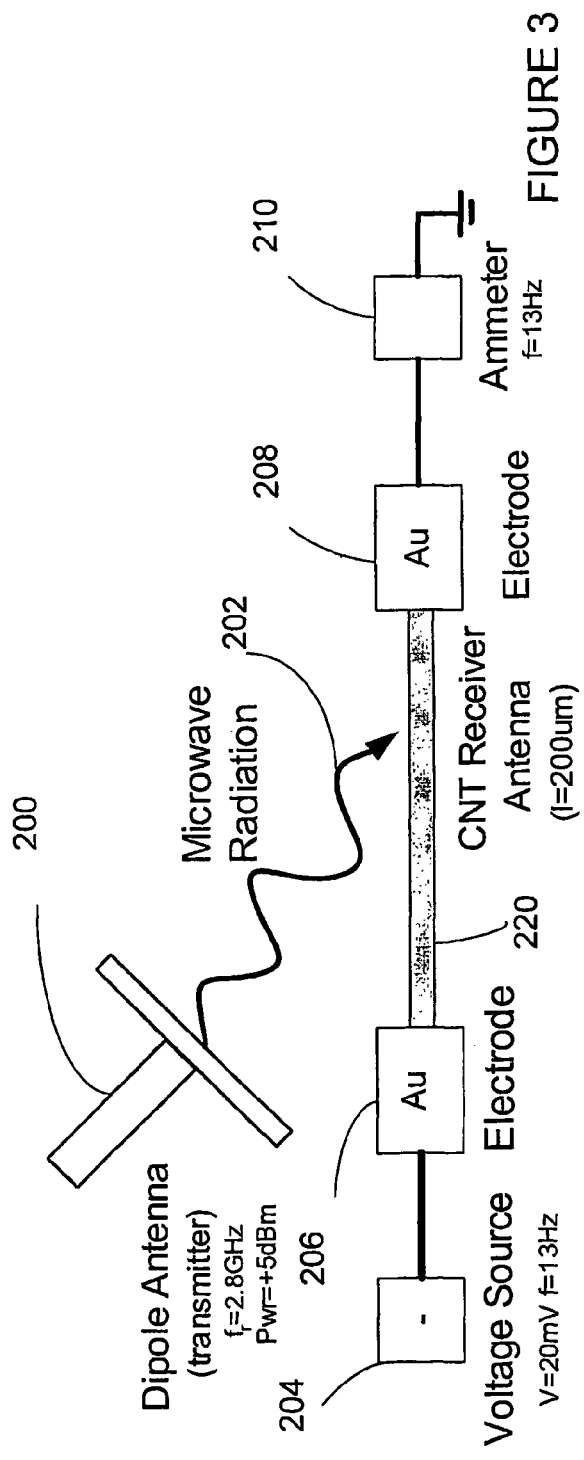
FIG. 3 depicts a block diagram of a carbon nanotube receiving antenna and dipole transmitting antenna.

Antenna Experiment: As shown in FIG. 3, an unbalanced dipole transmitting antenna, which is resonant at f=2.8 GHz, was placed about 2 inches from a sample comprising a carbon nanotube receiving antenna with electrode spacing of 200 micrometers. The nanotube antenna was formed in accordance with the method described above.

In examining the nanotube receiving antenna, using a lock-in amplifier, the nanotube current was measured as a function of the RF radiation field being ON or OFF and whether the field was applied at the transmitting antenna's resonant frequency (fr=2.8 GHz) or not (f=1 GHz). The transmitting antenna was driven at a single frequency in CW mode with a power of +5 dBm by a network analyzer.

Figure 4:
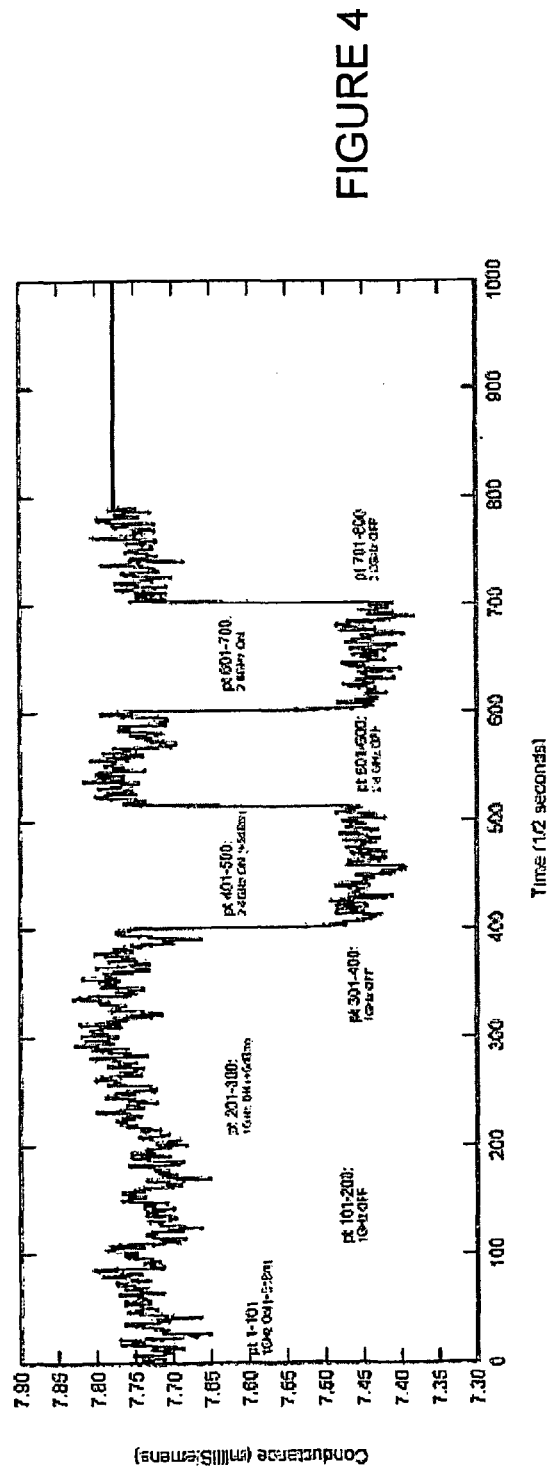
FIG. 4 depicts a graph illustrating conductance measurements of the carbon nanotube receiving antenna shown in FIG. 3.

The measured data, shown in FIG. 4, indicates there is a 0.3 millisiemens decrease in the nanotube's DC conductance when RF radiation at the resonant frequency of the transmitting antenna (f=2.8 GHz) was applied to the receiving nanotube antenna. When the transmitting antenna is driven at a frequency far removed from its resonance, e.g. f=1 GHz, no change in the CNT's conductance was noticed, because the transmitting antenna efficiency was low. These results indicate that the CNT on the sample is acting as a receiving antenna.

In the foregoing specification, the invention has been described with reference to specific embodiments thereof. It will, however, be evident that various modifications and changes may be made thereto without departing from the broader spirit and scope of the invention. For example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. An interconnected system, comprising:
a first device, and
a second device wirelessly coupled to the first device, wherein the second device includes one or more antenna arrays comprising a plurality of nanostructure-based antennas coupled thereto, wherein each nanostructure-based antenna has a separate resonant frequency and is configured to communicate over a separate wireless frequency channel corresponding to the resonant frequency of the nanostructure-based antenna,
wherein the first device includes one or more antenna arrays comprising a plurality of nanostructure-based antennas coupled thereto, wherein each nanostructure-based antenna has a separate resonant frequency and is configured to communicate over a separate wireless frequency channel corresponding to the resonant frequency of the nanostructure-based antenna.

2. The system of claim 1 wherein the second device is configured to communicate over the plurality of nanostructure-based antennas.

3. The system of claim 1 wherein each of the nanostructure-based antenna is formed from a composite material comprising a nanostructure element.

4. The system of claim 3 wherein the nanostructure element is a nanotube.

5. The system of claim 1 wherein each of the nanostructure-based antennas is selected from a carbon single walled nanotube, a carbon double walled nanotube, a semi-conductor nanowire, and a metal nanowire.

6. The system of claim 1 wherein the second device includes a plurality of communication ports, wherein each of the nanostructure-based antennas is coupled to one of the plurality of communication ports.

7. The system of claim 1 wherein the first device is configured to communicate over the plurality of nanostructure-based antennas.

8. The system of claim 1 wherein each of the nanostructure-based antenna is formed from a composite material comprising a nanostructure element.

9. The system of claim 8 wherein the nanostructure element is a nanotube.

10. The system of claim 1 wherein each of he nanostructure-based antennas is selected from a carbon single walled nanotube, a carbon double walled nanotube, a semi-conductor nanowire, and a metal nanowire.

11. The system of claim 1 wherein the first device includes a plurality of communication ports, wherein each of the nanostructure-based antennas is coupled to one of the plurality of communication ports.

* * * * *